June 29, 1937.  E. HÖRNER  2,085,498
DEVICE AND METHOD FOR AERIAL SURVEY
Filed April 20, 1933  3 Sheets—Sheet 1
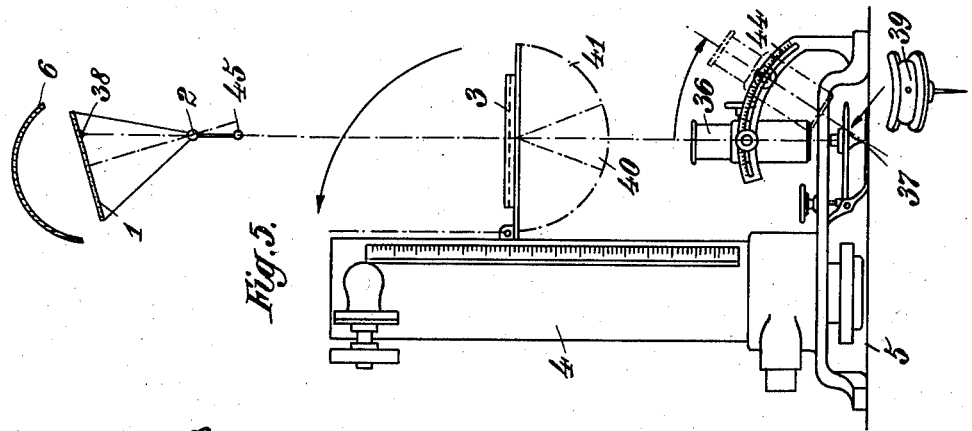
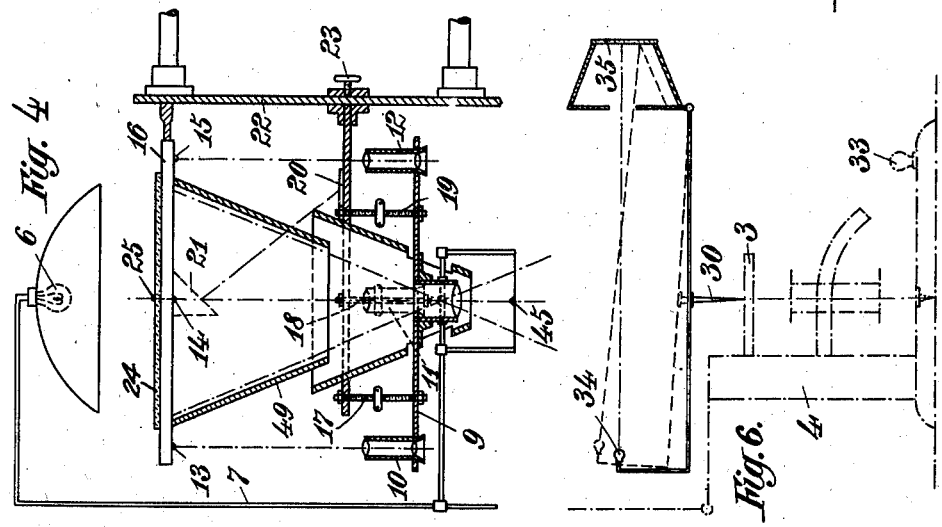
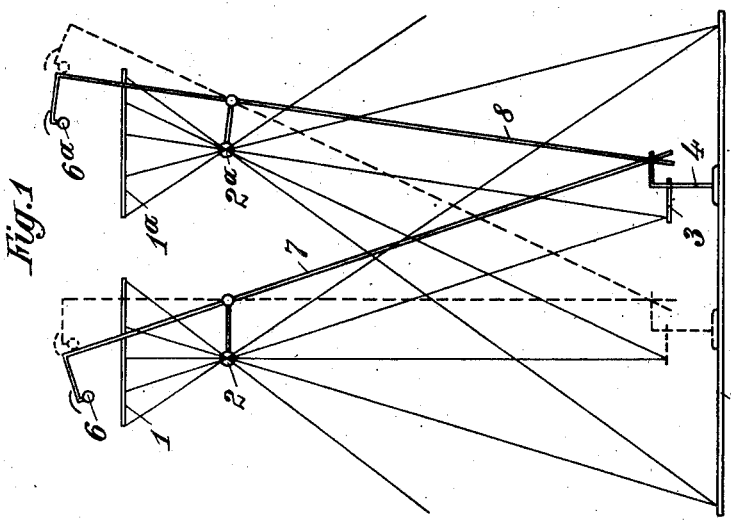
Inventor:
Erich Hörner
by
Attorney.

June 29, 1937.　　　　　E. HÖRNER　　　　　2,085,498
DEVICE AND METHOD FOR AERIAL SURVEY
Filed April 20, 1933　　　3 Sheets-Sheet 2
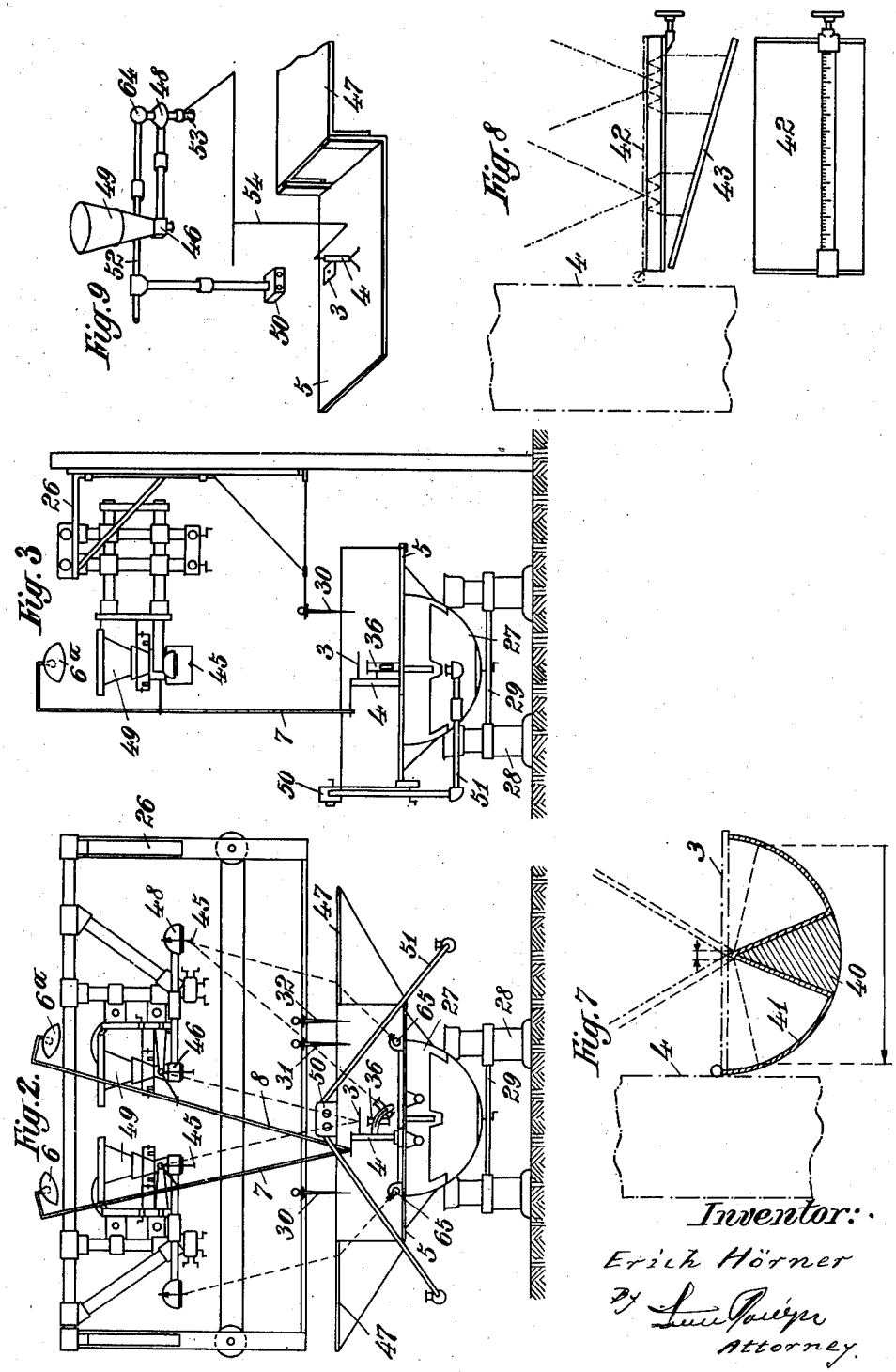
Inventor:
Erich Hörner
By
Attorney

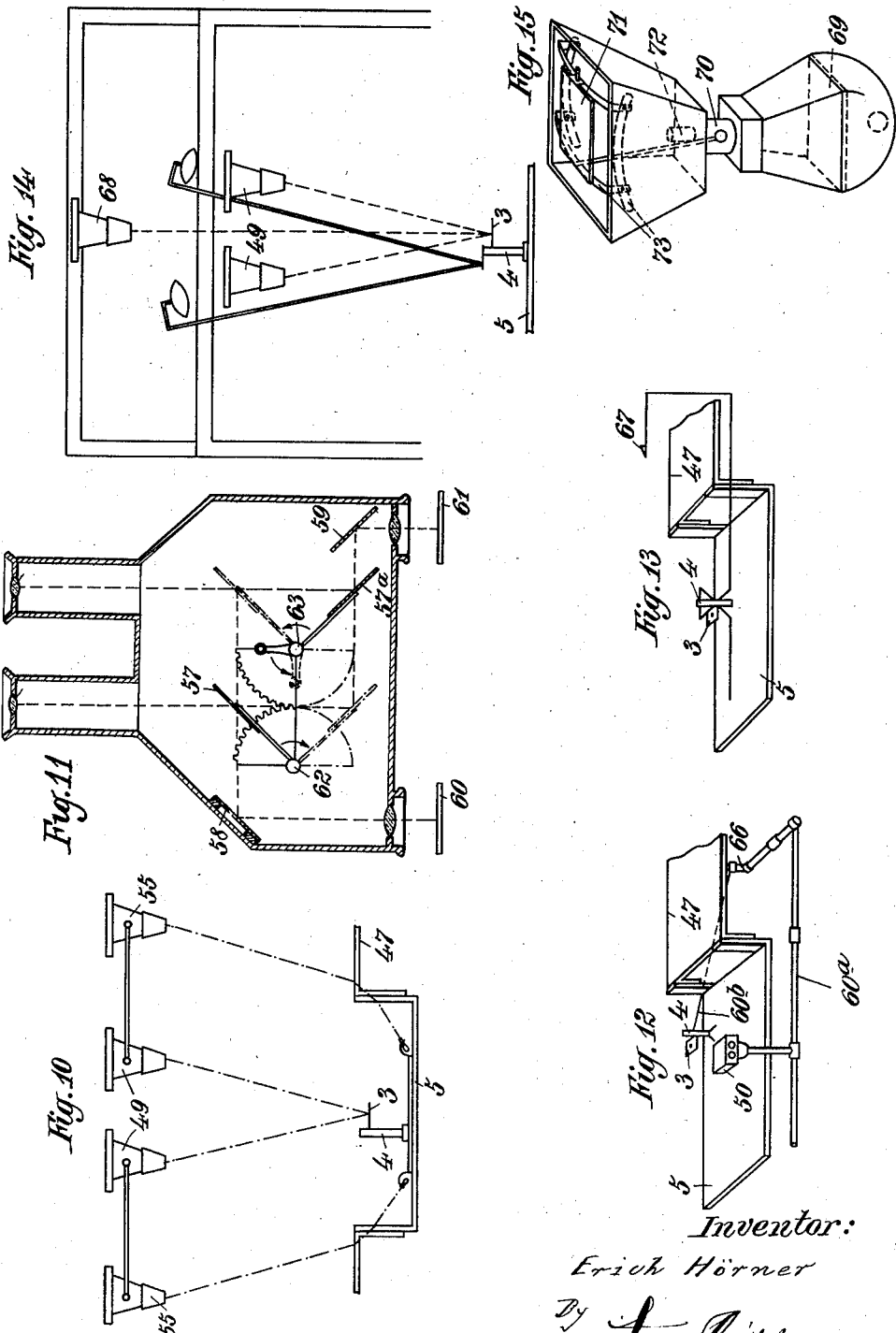

Patented June 29, 1937

2,085,498

UNITED STATES PATENT OFFICE 2,085,498

DEVICE AND METHOD FOR AERIAL SURVEY

Erich Hörner, Berlin, Germany

Application April 20, 1933, Serial No. 667,122
In Germany June 19, 1929

16 Claims. (Cl. 33—20)

The invention relates to devices and methods for stereoscopic survey employing two or more image projecting or carrying cameras for survey and reproduction. The invention relates particularly to topographic surveying and mapping by means of stereo-photographs of any description, viz. of any size, focal length, and direction of exposure, obtained by means of any system known (such as projection of ray intersection, stereoscopy, anaglyphs, pseudo-stereoscopy and pseudo-anaglyphs) both in the plane and in photographic relief, and has for its object to achieve such surveying in a much simpler manner than with the known devices and methods.

The invention is also applicable to the measuring out and reproduction in the solid of objects of all kinds, for example artistic objects, those in the useful arts, antiquities, and articles of anthropology, medicine, criminology, etc. In the surveying and reproduction of territory, that is areas of the earth's surface, the invention employs a method consisting in taking photographs from an aircraft at certain distances apart, which photographs partly overlap. Each successive pair of films or plates then constitutes a stereoscopic photograph of the territorial area photographed on the two plates. These stereoscopic pictures are placed in a stereoscope and the rays are caused to intersect in pairs in such a manner that the totality or integration of the intersections develops an optical model of the photographed territorial area, from which model a map can be drawn or a relief model of the section of the territory can be produced. This method encounters substantial difficulties because the pictures are taken at a great elevation, from 2000 to 3000 meters, practically amounting to infinite distance, and in the reproduction, that is the formation of the optical model, the complementary rays must be caused to intersect over the drawing or survey table.

In the devices heretofore known, intended for the same purpose, the optical laws holding true in geometric optics and the linear ratio of magnifications, as used for single projections, e. g. in the magic lantern and moving picture projection, have been simply transferred to double projection. This resulted in serious inconveniences of the known devices, and it is a further object of the present invention to do away with these drawbacks.

In order that the necessary overlap of the pictures was arrived at without the limit of solution of the grain of the plates being exceeded (as starting with 5.8 to 6 magnifications) two methods were made use of:—

(1) Optical means (such as mirrors, prisms, intermediate optic arrangements) were interposed so as to deflect the ray which brought the plates into an unnatural position. In this way the cameras were prevented from being in the way of each other, but otherwise the set so obtained was heavy and expensive and liable to substantial error; the intermediate members caused sensible losses of light and the external orientation of the plates was very inconvenient and tedious.

(2) The distance between the two cameras (projection base) was so large that it was practically impossible to handle them. The large projection base also caused all the rest of the apparatus and the separation of the planes of sharp projection to be inadmissibly large. The projections were so dark that very powerful and strongly heating lamps were necessarily used which produced conditions destructive of accuracy. Another serious inconvenience of the large projection base is that the grain of the plates is also magnified, whereby the accuracy of measurement is substantially impaired.

Defective accuracy and serious uneconomical factors in manufacture and operation constitute the main reasons for the only occasional use of the known expensive apparatus and for the failure of topographical surveying by means of stereoscopic pictures taken from aircraft and the making of optical models therefrom to emerge from the experimental stage.

The object of the invention is to overcome these disadvantages and to provide apparatus, particularly a double projector, for stereoscopic photographing which operates with the greatest accuracy, is cheap to manufacture, and is economical in operation.

The inventor, supported by more than ten years of experience, was the first to realize that in the case of double projection it is not admissible to simply apply geometric optics but that the devices of projection should be based on the physical optics.

The inventor started from the brightness of image which was the most suitable for the determination of the points of intersection and discovered the most suitable, viz. the brightest and smallest source of light, on which basis he obtained the distance between the objective lens and the plane of image.

Subsequent experiments with a large number of photographic plates of all kinds, led to the discovery that for all systems there is an average distance of the object lens from the plane of projection which must be maintained, with weak illumination, in order to obtain sharp pictures without danger of picture grain solution. In double projection it is not a question of separate rays which impinge on the plane of projection, but of pairs of rays, the intersection points of which must fall on the plane of projection. It was discovered that the determination or magnification factor, that is the ratio of the distance of the plane of projection to the object lens should have an average value of 6.2.

The difficult question also arose whether it is possible to produce intersection of the pairs of rays of stereoscopic pictures taken from practically infinite distances from the object directly over the drawing table without intermediate optical systems or the insertion of other means, having regard to the short distance of the object lens of the projector above the drawing table imposed by the factor 6.2. Lengthy experiments led the applicant to the second discovery that the distance of the two pictures of a stereoscopic photograph from each other must be multiplied by the same factor 6.2 in order to obtain the projection base, that is the distance between the axes of the two projectors or their objective lenses, with which projection base the desired ray intersection would be obtained over the drawing table. The picture separation is the measure of the displacement which one plate of a pair of plates undergoes relatively to the other when the two plates with the photographs on them, that is the actual stereoscopic photographs, are brought into coincidence.

The factor of magnification 6.20, which, of course, may practically vary in one direction or another in a slight degree, now permits of the plates being used in their natural position in space and of so closely approaching the projectors that up to 80% overlap of images can be obtained and they can be adjusted in any inclination desired.

By natural position in space is meant the position of a plate relative to the physico-optical plumb line at the instant of exposure. It is known that aircraft are subject to continual tilting movements so that a plate at the instance of exposure is horizontal only by chance, that is at right angles to the physico-optical plumb line. Usually the plates assume random oblique positions, and generally one plate of a pair of photographs will have a position relative to the plumb line which is different from that of the other plate. It is necessary, however, that the plates of a pair in each projection should be adjusted relatively to each other to assume the exact positions which they had at exposure. To make this possible there is marked on each plate the nadir, that is the point through which the physico-optical plumb line passes at the instant of exposure. This data according to the present invention makes it possible, in a manner to be subsequently described, to bring the plates in a simple manner into their natural positions in space and thus in the correct position relative to each other. This is termed external orientation.

In accordance with this, the double projector according to the present invention is mainly characterized in that the plates of stereoscopic photographs are held in their natural position in space, that is in the position which they had when the exposures were made, and that the determination or magnification factor has a value of 6.2 or approximating thereto, and that the projection rays are brought to intersect in pairs directly over the drawing table.

The projection rays fall through the object lenses of the picture projecting cameras directly and without refraction on to the drawing or surveying table or on to the mark plate of a drawing device movable over the table in such a manner that the measuring out or reproduction can take place in the direct ray path.

It is an important condition that the complementary main rays of a pair of images meet each other on the mark plate of the drawing appliance in any position of the set.

According to the present invention this condition is in a simple way fulfilled by the drawing appliance being coupled by suitable levers with the sources of illumination of the image projecting cameras. In this manner an organic connection is created between the projecting cameras and the drawing or modeling table. This connection is possible because the picture projecting cameras according to the invention are small and can be brought close together, and in adjusting the points the lamp casings can be relatively deflected.

The compact construction of the double projector according to the invention enables means for observing the stereoscopic exposures independently of the ray intersection projection to be attached and to be used for measuring as well as for adjustment purposes.

The drawings show several constructions of apparatus embodying the features of the invention. In these drawings:

Figure 1 illustrates diagrammatically a pair of plates with lamps in combination with a drawing device, Figs. 2 and 3 are two different views of a double picture projector with a drawing device movable over the drawing table, showing means for the external orientation of the plate, and means for observing the stereoscopic exposures or view finding, Fig. 4 shows a projector in section with means for the inner orientation, Fig. 5 shows apparatus for the external orientation of the projectors, Figs. 6 to 8 show means for checking the precision of adjustment of the projector, Figs. 9 to 14 show devices for observing, measuring, and controlling the stereoscopic picture taking, and Figs. 15 and 15a show a distortion redressing device as perspective and sectional views, respectively.

Fig. 1 diagrammatically shows two projection apparatuses for a pair of images together with a drawing appliance in accordance with the present invention. In this figure, I, I$^a$ are photographic plates of a stereoscopic pair, 2, 2$^a$ are the object lenses, and 3 the mark plate or mark carrier of a drawing appliance 4 displaceable on the drawing table 5. The sources of light 6, 6$^a$ are intended for throwing the main rays always on the mark 3, which is adjustable in height. To ensure this, the drawing appliance carrying the said mark is positively connected by links 7, 8 to the sources of light 6, 6$^a$, in such a manner that the said links turn about the said object lenses 2, 2$^a$ as poles. The apparatuses themselves are supported by brackets and are adjustable in a vertical direction. The plates I, I$^a$ are shown horizontal for simplicity.

The sources of light here shown are electric lamps, the efficiency of which may be increased by means known per se, such as reflectors. However, daylight may also be substituted for the lamps since according to the invention it is not the question of integrally illuminating the plate as a whole, but merely of sufficiently lighting the particular complementary points of a pair of images.

The apparatus can be used for all the plate sizes commercially available and with all customary systems of survey marks because different plate carriers are provided corresponding to these variations, which are interchangeable with each other in a simple manner.

The adjusting of the measuring plates in the inner orientation can be effected directly in a novel and simple manner, the apparatus according to the invention remaining unchanged in all its parts, particularly as regards light centering, and not having to be taken apart. On each plate, upon exposure, survey marks are made which coincide with the survey marks of the photographic camera and by means of which the plates can be laid on the survey marks of the projector so that the plates in the reproduction means assume the same position as in picture taking.

The rigid connection of the object lens with the drawing appliance according to the invention (Figs. 1, 2, 3) also requires a particular design of the appliance for the internal orientation (Fig. 4), whereby an adjustment of the internal orientation, viz. of the suitably marked principal points of the objective lens, or of the main plane thereof with respect to the plane of the measuring marks as to parallelism, separation, and centering, is possible. Figure 4 shows that the lamp 6 is connected by a rod 7 with the drawing device 4, and the rod can pivot about an axis passing through the center of the object lens. The object lens and the plate carrier are adjustable relative to each other. The said parallelism of the planes is obtained by means of several sighting appliances 10, 11, 12 with or without lenses and rigidly connected to the objective lens carrier 9, which appliances are brought into alignment with corresponding fixed marks 13, 14, 15 on the plate carrier 16, by tilting the objective lens carrier 9 by means of the tilting screws 17, 18 and 19, and locking it in this position by suitable means. The picture separation is adjusted by training one of the said sighting appliances upon a corresponding scale 20. This is preferably done with the aid of a mirror or prism 21 which is fixedly or removably located in the place of mark 14 or carries the same, and arranged at a constant angle to the axis of sighting. By varying the distance between the plate carrier 16 and the objective lens carrier 9, which is movable in a dovetail guide 22, by means of a micrometer screw 23, and taking the constant distance between the divisions of the scale and the sighting axis as the base of a rectangular triangle, the known angle of refraction permits a reading of the particular distance of the image as the altitude of that triangle, and to fix the carrier after correct adjustment.

Though in the case of the objective lens being rigidly connected to the carrier the said lens is centered while the planes are adjusted to parallelism, it may be advantageous for interchangeable optical systems to effect centering separately. This is done by projection (Fig. 4) in such a way that on the system of marks is imposed a glass plate 24 with cross hairs, and this plane is adjusted in parallelism with a plane of reference, preferably the horizontal plane of the table (Figs. 1, 2 and 3), and brought into a definite relationship with the apparatus adjusted vertically By means of an optical leveling attachment, the cross hairs 25, viz. the center of the mark plate 24, are aligned plumb with the datum plane, and then the objective lens is centered by means of adjusting screws which move it in a perpendicular dovetail guide of the object lens carrier 9. The front main point of the lens is marked either physically or by a small diaphragm aperture, and the centering is completed when the said point coincides with the plumb mark. This device according to the invention enables the inner orientation of each camera, that is both the photographing and the measuring camera to be controlled as regards its accuracy and correctness, which was not possible in previous systems. As the distance of the images can be changed, the present device can be used for different focal lengths and is not dependent on a definite kind of camera for taking the photos or on any focal length of the lenses used for this purpose.

At the same time this mode of measuring requires change of height of the whole device in order that the mean distance of the plane of sharp images from the center of the plane of projection is adapted to the particular angle of inclination. To this end the brackets 26 (Figs. 2 and 3) are adjustable vertically. This modification of the height may occur automatically with the adjustment of the inclination. In this way it is possible to obtain all movements supplementing one another and required for the maintenance of the optical conditions of the projections by one adjustment only.

The external orientation of the photos taken that is the location of the plates in their positions in space, is effected as follows:

After adjustment of the plates in the internal orientation of the camera as above described, the principal axes thereof are swung into the vertical or plumb positions. Plumbing or fixation of the plumb points can be done by means of a collimator 36 (Figs. 2, 3, 5) which is adjustable for the various distances and provided with suitable marks. The same projects the particular points on the datum plane 5, or for better marking these projections on the said datum plane the said points are projected on a small disc, like a drawing pin head, disposed below the collimator and having its point in alignment with the axis of the collimator; the latter having been correctly adjusted, the point of the said pin is pressed into the datum plane.

A physical-gravimetric orientation—the external orientation—distinct from the geometrical mutual orientation, of the photos enables the invention to be carried out easily and in several ways.

In the first place, by a suitable arrangement of the table of projection, which according to the invention is mechanically connected with the projector and the main feature of which consists in that the whole adjustability required of its plane starts from one point. This point is materialized as the center of a sphere so that the plane 5 (Figs. 1, 2 and 3) preferably mounted in its center represents a tangential or diametral plane of an upright or lying down hemisphere 27, which can be inclined in any direction about this center, and whereof the adjustment can be accomplished from two sides only. The table may be more stably supported by providing telescopic feet 28 extended by an endless band 29. For its adjustment also suitable rules or round spirit levels may be used.

Orientation can be further facilitated by the points in the optical model intended for orientation being held or marked in their physically non-orientated position in space. These space point holders 30, 31, 32 may consist of pointers independent of the movements of the table and mounted, for example, on the apparatus susceptible of lowering. On these space point holders the pointers are adjustable in any direction by compound guides and can be locked by fixing screws. The adjustment thereof is accomplished by the particular points being identified in the optical model by means of a drawing appliance 3 or its mark, and the pointers of the space point holders 30, 31, 32 being subsequently lowered upon these marks and then locked. The adjustment of the plane 5 is thereupon done as described with the advantage that on account of the adjustability of the table, all points may be orientated simultaneously, the contact of the marks with the corresponding points being determinable very accurately. In order that the precision of this operation is further increased the space point holders 30, 31, 32 may be provided with suitable mechanical or electric light or acoustic signals 33 (Fig. 6) which indicate the intensity of contact, for instance, in such a way that no light signifies the absence of contact, white light signifies correct contact, and red light excessive contact. The space point holders 30, 31, 32 may also be connected with a contact lamp 34, the beam of light of which strikes a mirror 35. Then the angle of refraction of the beam of light indicates the pressure exerted by the space point holder on the mark 3 of the marking appliance 4.

It is the question of so adjusting the projecting device with respect to the drawing table that the plate used for taking the photo is brought into the position in the space it had when the particular photo was taken. This external orientation is accomplished by the projector being swung with the plate of the photo taken until the nadir point of the said plate coincides with the foot point plumbed from the marked center of the projection.

To this end is used, according to the invention, an appliance which permits copying and marking of the marked center of projection, the determination and tracing of the situation and the height of the various photographed points and exact fixation of the points of intersection of complementary rays of projection of stereophotographic pictures, and of the distance of the centers of projection from the plane of projection (distance from the photographed object) after completed orientation.

According to the invention this appliance consists of a marking attachment 4 manually or mechanically displaceable on the drawing table 5 (Fig. 5) with a projection plate 3 adjustable in height and hinged or swingable in a lateral direction and provided with a mark, and of a collimator 36. The latter is swingable about a point 37 situated in the drawing plane and being the foot point of the vertical passing through the mark of the projection plate 3 so that the axis of the said collimator 36 can be swung away from its normal position in which it coincides with the vertical line passing through the mark of plate 3.

In order that this mark is more easily found, it can be luminous in colors differing from the tinge of the photos. In this case the mark is transparent and illuminated by a small lamp disposed below it. A screen revolubly arranged between this lamp and the said mark and in various colors causes the mark to appear in the color desired (red, green, etc.). In order that the mark may be viewed more easily the support thereof may be provided with a mirror or an erecting prism, in which the mark is observed.

With its plate 3 swung against the support, the said appliance is located below the projector 6 until the vertical ray passes through the telescope (collimator) 36 and the object-lens 2. Thereupon also the projector 6 and the object lens 2 are swung until also the nadir 38 of the photo plate 1 is in alignment with the vertical ray. The projection 37 so obtained of the nadir on the drawing plane 5 is marked by the needle of a sort of thumb tack 39 being stuck into the said plane. At first the points taken are fixed and marked by a drawing pencil taking the place of the said thumb tack and which is also within the vertical passing through the said mark 3, the various points scanned by this mark being traced successively in the well-known way.

The accuracy of measurement is increased according to the invention by a refinement of the determination of the exact adjustment, e. g. of the vertical ray or of the conjugated ray intersections. This refinement is arrived at by a magnification of the distance between the projected points of a deficient adjustment without the points themselves being magnified, and in this way the inconvenience of such an optic magnification (blurring of the points, etc.) is avoided while the distance magnified is rendered even more conspicuous as compared with the points not magnified.

To this end, below the projection plate 3 of the marking appliance 4, there is located a reflecting cone 40 (Figs. 5, 7), which is mounted, coaxially with the vertical of the marking attachment described, within a hemisphere 41 which is internally white or reflecting, the apex of the said cone coinciding at the same time with the mark 3 and being situated within the same plane with it so as to penetrate through the marking plate 3. For the determination of special points, for instance horizontal orientations, measurements of heights, etc. the projection plate is swung away and the rays then strike the cone 40 directly. Adjustment being correct, the point of intersection of the rays coincides with the apex of the said cone, but when adjustment is poor, viz. too low, the rays (or at least one ray) strike its surface, from which they are reflected toward the spherical surface 41 in accordance with the angle of refraction. In this way the points will scatter and this phenomenon will disappear when absolute coincidence is attained, that is when the point of intersection coincides with the apex of the cone. The design and the shape of the cone 40, and more particularly the angle at its apex the same as the design and shape of the spherical reflecting surface, should be adapted to the angles of intersection or refraction prevailing in practice. When the said concave surface is made translucid, the distance of the conjugate points could be read from a plane located below the said surface, which plane should be provided with a measuring grid for more accurate determination and susceptible of being swung into the direction of motion of the corrections of adjustment. Moreover, the marking appliance may be provided with a diopter, with or without measuring grid, with or without microscope, so that the differences appearing on the marking plate 3 or the cone 40 or the reflecting surfaces could be easily viewed, and further with suitable screening arrangements adapted to keep troubling rays away from the plate or the cone or the reflecting surfaces.

The reflecting cone may also be substituted by a "refracting grid" 42 (Fig. 8) of the type used for spectral analyses, so that also in this instance the distance between the conjugate points or the cross section of the perpendicular ray can be magnified without the points being likewise magnified. The said refracting grid may be located removably on the projection plate 3 and substituted for the mark otherwise provided for so that the conjugate points are separated from one another within the plane of intersection. Preferably also screening attachments, e. g. of the iris diaphragm type, can be used for screening the surface of the projection plate, and further for reading from below, angular mirrors 43, etc.

According to the present invention, the determination of the elevation of the center above the plane of projection (of the distance from the object taken) is accomplished in an optical-trigonometrical way. The center of projection 2 is aimed at from a point given on the datum plane (drawing table 5), e. g. from the foot point of the perpendicular of a complementary projector, for instance by means of the collimator 36 which can be tilted about the point of intersection of both optical axes with the datum plane 5 and is provided with a suitable graduation 44 for reading the azimuths. In this case the drawing pin should be removed. From the known distance of the foot points of the two projectors from each other and the obtained azimuth of the collimator, the length of the perpendicular of the marks of projection can be found as a trigonometric function.

This determination may be further simplified by the said collimator being stationary but provided with another tiltable optical plumb with which it is connected by a rigid arm of known length. In this way at the same time as the foot point of the perpendicular of the point used for taking the photo is stated, also the length of the said perpendicular can be stated and directly read from the corresponding division of the graduated arc. Such a plumb could also be advantageously used as adjusting plumb for the horizontal orientation described.

For sighting a luminous or reflecting means 45 (Figs. 2, 3, 4, 5) a small electric lamp or a prism may be suspended below the object lens of either camera so that it adjusts itself like a pendulum always in the gravity line starting from the front main point of the said lenses. The same result is obtained by the means being mounted on a loop suspended from the gimbal-mounting described of the object lens. When not in use this loop is swung away.

This luminous mark 45 being sighted, the perpendicular found is the distance of the said mark from the table 5, and to this length the distance of the luminous mark 45 from the center of the object lens is to be added.

For checking purposes the possibility of a sterecscopic or pseudo-stereoscopic observation of the relief is very important, and according to the invention this possibility is afforded in an advantageous manner by either method (chromatic or optic separation of the images).

The stereoscopic observation on the system of optic separation of the images, which is in this instance also obtained by a projection of the stereoscopic pictures, according to this invention affords the advantage of a higher precision as the observation and subsequently the measurements are accomplished with the magnification of the projection. The observation can be accomplished in several ways, for instance, by refracting means 46 (Figs. 2, 9) mirrors silvered on their surface, prisms, or other semi-refracting, semi-reflecting means inserted below the object lens of the projector in the outer ray path, preferably very close to the object lens so that these means can be made very small. In this way the direct distance of the planes of sharp image from the object lens is reduced and the projections are separated from each other and brought by mirrors into a new common plane or into two planes having a definite relationship with each other, which may have any location.

It is however advantageous to maintain the plane of stereoscopic projection and to use a new plane easily introduced or two planes 47 the distance of which is that of the projections and of the planes of sharp image. Figure 9 shows this modification diagrammatically in combination with only one projector 49. The other side of the stereoscopic projector is symmetrical therewith. This arrangement is convenient because when suitably constructed it can remain in permanent setting. The stereoscopic planes 47 may be adjustable in all directions relatively to the plane 5 and may also be oriented together therewith. In the illustrated construction the rays are refracted by mirrors or prisms 48 on to the plane 47.

A convenient arrangement is to have each refraction system connected with its projection camera 49, Figure 9, in such a manner that it will follow all movements of the camera, and also to have the connecting line between the real and the virtual projection center lying at right angles to the real main axis of the camera, the first center being preferably also the center of movement. The connections must be such as to permit movement in all directions.

The observation of the stereoscopic pictures requires a double glass 50 (Figs. 2, 3, 9) which in its arrangement is adapted to the disposition of the stereoscopic planes 47 and to the conditions of observation. It could be provided for separately, or combined with the refractive planes. The first type is shown by Figs. 2 and 3. By tubes 51 the rays of vision are guided beneath the surfaces 47 which must be transparent in this instance. The other type is shown by Fig. 9 representing only one side of the attachment. In this case the rays of vision coming from the observing glass 50 are led through the refractive system 52 and refracting means 48 onto the planes 47. The refractive means 48 used is a means half refractive and half transparent. For control purposes the ray intersection projection device is connected with the device for stereoscopic observation, to effect which the marking attachment 3, 4 is connected with the aiming telescope 53 by levers 54, as shown in Fig. 9, so that when it is displaced also the said aiming telescope is displaced at the same time.

A further method, which does not require mirrors and prisms, consists in providing the object lenses with a removable attachment adapted to displace the plane of sharp images so that the latter is raised above the union of the groups of rays in which distance the planes of stereoscopic projection are to be interposed.

It is also possible to do it without mirrors and prisms when for the projections on the planes 47 so-called sister cameras 55 (Fig. 10) are used having the same determinating factor as the main cameras and into which copies of the photos made by means of the latter are brought. In order that the conformity of the movements of the sister cameras is ensured while being orientated, each of them is coupled with its associated main camera so that each pair can be adjusted about identical centers of motion only. This arrangement comprising the sister cameras permits of flashing with the stereoscopic projections without derangement of the same. The arrangement of the cameras according to Fig. 10 may be combined with the apparatus for stereoscoping projections according to Figs. 9–12 and 13.

By the present invention this inconvenience is avoided by the stereoscopic effect being converted into a pseudo-stereoscopic effect. Hitherto this was obtained by a displacement of prisms and mirrors which, however, resulted in intricate arrangements.

According to the invention the pseudo-plasticity or exchange of pictures is obtained by tilting the mirrors or prisms through an angle of 90° so that the same mirror planes always remain in the visual direction. In order that vision is not hindered, the refractive means mentioned must be displaced parallelly behind each other, in any event by the insertion of suitable, e. g. half-transparent prisms, in one or either path of rays for correction so that the two axes of vision opposed to each other are in alignment. A particularly simple arrangement is obtained in this connection in such a way that the two axes of rotation of the planes of refraction are caused to coincide with the opposed edges of the said planes and coupled with each other by gears or levers so that by one of the planes being turned the desired rotation is also imparted to the other conjugate plane.

An embodiment of the invention is shown by Fig. 11 diagrammatically, 56 and 56ª denoting the two eye-pieces, 57, 57ª, 58, 59 the mirrors, and 60, 61 the stereoscopic pictures. The mirrors 57, 57ª can be tilted through an angle of 90° about the fulcrum pins 62 and 63, respectively. When the mirrors 57, 57ª occupy the positions shown by solid lines, the picture 60 is seen through the eye-piece 56 and the picture 61 through the eye-piece 56ª. The mirrors 57, 57ª, however, having been tilted into the positions marked by chain lines, the picture 60 is brought into the eye-piece 56ª and the picture 61 into the eye-piece 56.

The checking possibilities above described and afforded by stereoscopic observation are further extended to the adjustment of marks traveling within the field of vision and to drawing and measuring according to the positions of these marks.

Such an apparatus, in which the observer looks at the plane 47 over the virtual center 64 through the telescope 50, is shown in Figures 2 and 9b. Collimators 65 are connected positively to the drawing device, the lamps of which carry marks, for example arrows, and these marks are projected below the transparent planes 47. The marks appear to the observer in the view-finding glass 50 as only a plastic mark, or in the solid. The collimators 65 are displaced along with the device 4 on the table 5. Their rods are telescopic and are so connected by means of an adjusting device with the plate 3 for receiving the ray intersection point that the rod may be lengthened, that is, the distance of the lamps from each other, and therefore also the distance of the marks projected on the planes 47, may increase when the plate 3 is raised, while the distance between the marks is diminished by lowering the plate 3. For example, if the ray intersection point of the plate 3 should be directed on the point of a church spire, which is in the photographed area of territory, then the marks on the planes 47 are set also on to the point of the church spire appearing in these projections. Then the observer sees the church spire point in relief in the spectacles 50 and the two shifting marks of the planes 47 as only a single plastic or relief mark, which must coincide exactly with the point of the church spire if the setting of the plate 3 is correct. Thus, for the first time the stereoscopic ray intersection measurement is combined with the real stereoscopic measurement with mutual adjustment.

The same result can be obtained if instead of the luminous mark the glass of the telescope 53 has engraved marks so that to the observer these marks appear as a plastic mark.

An advantage is afforded by the fact that the stereoscopic glass 50 permits the observation not only of the stereoscopic projection but also of the separate projections and their marks. This is arrived at by the provision of suitable mirrors within the stereoscopic glass 50, which are half-transparent so as to permit the plane of projection to be looked at in order to see the two types of projection in the event that they are above each other unless the field of vision is made accessible to observation by the said mirror being swung off. When the glass 50 is provided with shutters opening and closing in harmony with the flashing of the projection cameras, it is possible to check the stereoscopic projections on surface 5. This arrangement could be simplified by the glass of stereoscopic observation 50 being separated from the table and having the shape of simple spectacles. The shutters thereof must close and open in harmony for stereoscopic observation and out of harmony for pseudo-stereoscopic observation. In the event that an anaglyph observation is taken, the basis given by the stereoscopic glass could be enlarged, which would result in an exaggerated plasticity and increased accuracy of observation.

Another construction of the apparatus for a stereoscopic operation and measurement is illustrated in Figures 12 and 12a. The observation rays are conducted from the view finder glass 50 through the tube 60a and telescope 66 below the planes 47. The marks are engraved on the glasses of the telescope 66 itself and no projection lamps are present. The telescope 66 is coupled with the drawing device 4 by means of a rod 60b so as to be displaced with the same. Also in this case the separation of the glasses and therefore of their marks is varied by shifting the plate 3, as in the apparatus shown in Figures 2 and 9b. The apparatus according to Figures 12 and 12a has the advantage however that the total observation is not interfered with by shadows, also the insertion of refracting means between the view finding glass 50 and the telescope 66 is avoided.

In the modification according to Figures 13 and 13a, means such as conical prisms 67, reflecting in the light of projection, are inserted between the telescope 53 and the planes 47 and are connected with the drawing device 4 in such a manner that they move along with the latter, and when the plate 3 is shifted in vertical direction they are either separated or drawn together.

Further the automatic positive or direct coupling with the marking appliance for the stereo-projection could be omitted and the guiding and adjustment of the marks or collimators, aiming telescopes, etc. could be effected separately; and by means of pantographs a plurality of drawings could be made simultaneously on the same or on different scales. The movement could be accomplished directly by hand or mechanically by coordinated slide guides, and also electrically.

The change of the distance between the planes of sharp images, as rendered necessary by the modification of the distance of the picture, can preferably be obtained by the modification of elevation of the device over the table as a whole in the way already described. With this adjustment also the movement referred to of the object lens, viz. the change of the distance of the picture may be coupled automatically and positively.

When reliefs and other bodies are to be reproduced in the solid in accordance with stereo-photographic views or pictures, this is done in such a way that on the datum plane or work table an easily workable material such as plasticene, clay, wood, gypsum, is placed and worked out according to the intersections of the rays.

In order that the model worked out is also given, as far as possible, the character of the original photographed, the relief finished is according to the invention covered with a layer sensitive to light, which may also be sprayed in dimmed light. On this layer are projected the same rays of light of the projector as when the relief was modeled out of the solid and in this way the picture of the original is photographically transmitted to the copy thereof.

In case the bodily reconstructions provided with photographic pictures on their surface are to be further provided with the signs and figures as used in maps, for instance contours, this is accomplished as follows: The bodily models worked out according to the above procedure at the same time as the drawing of the map concerned are covered with a sensitive layer as described and the picture photographically taken is projected thereon but not yet developed. Thereupon the map associated with that model is photographed by means of the additional camera 68 (which to this end should be arranged for both photography and projection), and this plate is developed and again placed in the additional camera now serving as a projector without its relative position being changed therein. The bodily model is then placed exactly where the map was when being photographed, and exposed to the projection of the photo of that map. This having been done the bodily model successively subject to the projection of both the picture and the map is developed photographically.

I claim as my invention:—

1. Apparatus for surveying and physically reproducing objects of all kinds, particularly territorial surveying, with the aid of stereoscopic pictures and optical models, comprising at least two projectors adapted to hold the plates of the stereoscopic photographs in their natural positions in space, said projectors being arranged so that their projection rays in pairs are caused to intersect directly on the drawing or surveying table, whereby drawing, measuring out, and reproduction can be obtained in the direct ray path, a mark plate, a drawing device, and two projectors, the latter being connected with the drawing device by means of rods pivotable about the centers of the object lenses of the projections, whereby by shifting the drawing device both projectors are always adjusted on the point of the field to be illuminated.

2. Apparatus for surveying and physically reproducing objects of all kinds, particularly territorial surveying, with the aid of stereoscopic pictures and optical models, comprising at least two projectors adapted to hold the plates of the stereoscopic photographs in their natural positions in space, said projectors being arranged so that their projection rays in pairs are caused to intersect directly on the drawing or surveying table, whereby drawing, measuring out, and reproduction can be obtained in the direct ray path, a mark plate and two projectors, and which comprises semi-transparent and semi-refracting means inserted in the direct ray path to enable both the direct observation of the photographs for bringing the ray intersection on the mark plate, and a double observation glass for obtaining a stereoscopic observation thereof in separate projections.

3. Apparatus for surveying and physically reproducing objects of all kinds, particularly territorial surveying, with the aid of stereoscopic pictures and optical models, comprising at least two projectors adapted to hold the plates of the stereoscopic photographs in their natural positions in space, said projectors being arranged so that their projection rays in pairs are caused to intersect directly on the drawing or surveying table, whereby drawing, measuring out, and reproduction can be obtained in the direct ray path, a mark plate and two projectors, which comprises semi-transparent and semi-refracting means inserted in the direct ray path to enable both the direct observation of the photographs for bringing the ray intersection on the mark plate, and a double observation glass for obtaining a stereoscopic observation thereof in separate projections, the mark plate being positively connected with the object lenses of the double observation glass so that the lines of sight of the observer in the glass are always directed on those points of the lateral projection plane which appear as intersection points of the direct rays on the mark plate.

4. Apparatus for surveying and physically reproducing objects of all kinds, particularly territorial surveying, with the aid of stereoscopic pictures and optical models, comprising at least two projectors adapted to hold the plates of the stereoscopic photographs in their natural positions in space, said projectors being arranged so that their projection rays in pairs are caused to intersect directly on the drawing or surveying table, whereby drawing, measuring out, and reproduction can be obtained in the direct ray path, two projectors connected with a drawing device by means of rods pivotable about the centers of the object lenses of the projections, whereby by shifting the drawing device both projectors are always adjusted on the point of the field to be illuminated, and a double observation glass with objective lenses provided with marks which appear as plastic or in relief in said glass to the observer.

5. Apparatus for surveying and physically reproducing objects of all kinds, particularly territorial surveying, with the aid of stereoscopic pictures and optical models, comprising at least two projectors adapted to hold the plates of the stereoscopic photographs in their natural positions in space, said projectors being arranged so that their projection rays in pairs are caused to intersect directly on the drawing or surveying table, whereby drawing, measuring out, and reproduction can be obtained in the direct ray path, a mark plate and two projectors which comprise semi-transparent and semi-refracting means inserted in the direct ray path to enable both the direct observation of the photographs for bringing the ray intersection on the mark plate, and a double observation glass providing stereoscopic observation of the photographs in separate projections, the mark plate having collimators positively connected therewith, which throw luminous marks on those points of the lateral projection plane which appear both in the observation glass and also on the mark plate.

6. Apparatus for surveying and physically reproducing objects of all kinds, particularly territorial surveying, with the aid of stereoscopic pictures and optical models, comprising at least two projectors adapted to hold the plates of the stereoscopic photographs in their natural positions in space, said projectors being arranged so that their projection rays in pairs are caused to intersect directly on the drawing or surveying table, whereby drawing, measuring out, and reproduction can be obtained in the direct ray path, a mark plate and two projectors which comprise semi-transparent and semi-refracting means inserted in the direct ray path to enable both the direct observation of the photographs for bringing the ray intersection on the mark plate, and a double observation glass providing stereoscopic observation of the photographs in separate projections, and in which the mark plate having collimators positively connected therewith, which throw luminous marks on those points of the lateral projection plane which appear both in the observation glass and also on the mark plate, and the observation glass being provided with means for observing the mark plate.

7. Apparatus for surveying and physically reproducing objects of all kinds, particularly territorial surveying, with the aid of stereoscopic pictures and optical models, comprising at least two projectors adapted to hold the plates of the stereoscopic photographs in their natural positions in space, said projectors being arranged so that their projection rays in pairs are caused to intersect directly on the drawing or surveying table, whereby drawing, measuring out, and reproduction can be obtained in the direct ray path, and an object lens carrier having sighting means and a scale, which means, by sighting marks provided on the picture carrier of the cameras enable parallelism between the planes of the picture and the object lens to be effected, one of the marks being provided by an angular mirror or prism by means of which the sighting line from the corresponding sighting device is refracted and thrown upon the scale on the object lens carrier.

8. Apparatus for surveying and physically reproducing objects of all kinds, particularly territorial surveying, with the aid of stereoscopic pictures and optical models, comprising at least two projectors adapted to hold the plates of the stereoscopic photographs in their natural positions in space, said projectors being arranged so that their projection rays in pairs are caused to intersect directly on the drawing or surveying table, whereby drawing, measuring out, and reproduction can be obtained in the direct ray path, the projection plane being located on a hemi-sphere pivotable about its center point, said center point lying in the plane of projection between the vertical axes of the projectors and which also is vertically adjustable.

9. Apparatus for surveying and physically reproducing objects of all kinds, particularly territorial surveying, with the aid of stereoscopic pictures and optical models, comprising at least two projectors adapted to hold the plates of the stereoscopic photographs in their natural positions in space, said projectors being arranged so that their projection rays in pairs are caused to intersect directly on the drawing or surveying table, whereby drawing, measuring out, and reproduction can be obtained in the direct ray path, and means for the external orientation thereof, and in which the projectors being attached to a frame by means of a space coordinating system which may be raised and lowered as a whole on brackets.

10. Apparatus for surveying and physically reproducing objects of all kinds, particularly territorial surveying, with the aid of stereoscopic pictures and optical models, comprising at least two projectors adapted to hold the plates of the stereoscopic photographs in their natural positions in space, said projectors being arranged so that their projection rays in pairs are caused to intersect directly on the drawing or surveying table, whereby drawing, measuring out, and reproduction can be obtained in the direct ray path, means for the external orientation thereof, and in which the projectors being provided to a frame by means of a space coordinating system which may be raised and lowered as a whole on brackets, the projection plane being located on a hemi-sphere pivotable about its centre point which lies in the plane of projection between the vertical axes of the projectors and is vertically adjustable, and in which space point holders are arranged for sliding and tilting movement in all directions on a plane, which holders are adjustable to that point of the optical model upon which the projection plane is adjusted by shifting the hemi-sphere.

11. Apparatus for surveying and physically reproducing objects of all kinds, particularly territorial surveying, with the aid of stereoscopic pictures and optical models, comprising at least two projectors adapted to hold the plates of the stereoscopic photographs in their natural positions in space, said projectors being arranged so that their projection rays in pairs are caused to intersect directly on the drawing or surveying table, whereby drawing, measuring out, and reproduction can be obtained in the direct ray path, means for the external orientation thereof, and in which the projectors are provided to a frame by means of a space coordinating system which may be raised and lowered as a whole on brackets, the projection plane being located on a hemi-sphere pivotable about its centre point which lies in the plane of projection between the vertical axes of the projectors and is vertically adjustable, and in which space point holders are arranged for sliding and tilting movement in all directions on a plane, which holders are adjustable to that point of the optical model upon which the projection plane is adjusted by shifting the hemi-sphere, and all the projection eye-pieces having sighting means which automatically adjust themselves in the vertical plumb line and whose distances from the projection center remain constant, which devices can be moved away from the direct ray path when the apparatus is out of use.

12. Apparatus for surveying and physically reproducing objects of all kinds, particularly territorial surveying, with the aid of stereoscopic pictures and optical models, comprising at least two projectors adapted to hold the plates of the stereoscopic photographs in their natural positions in space, said projectors being arranged so that their projection rays in pairs are caused to intersect directly on the drawing or surveying table, whereby drawing, measuring out, and reproduction can be obtained in the direct ray path, a mark plate, a drawing device, and a drawing table so arranged that the projection rays of the two projectors are caused to intersect in pairs directly on the mark plate of the drawing device which is movable over the drawing table, and means for the external orientation of the two projectors a collimator pivotable about the foot point of the collimator on the drawing table and a mark plate which can be adjusted in vertical direction and also withdrawn from the collimator axis.

13. Apparatus for surveying and physically reproducing objects of all kinds, particularly territorial surveying, with the aid of stereoscopic pictures and optical models, comprising at least two projectors adapted to hold the plates of the stereoscopic photographs in their natural positions in space, said projectors being arranged so that their projection rays in pairs are caused to intersect directly on the drawing or surveying table, whereby drawing, measuring out, and reproduction can be obtained in the direct ray path, a mark plate, a drawing device, and a drawing table so arranged that the projection rays of the two projectors are caused to intersect in pairs directly on the mark plate of the drawing device which is movable over the drawing table, and means for the external orientation of the two projectors a collimator pivotable about the foot point of the collimator on the drawing table and a mark plate above the collimator and which can be adjusted in vertical direction and also withdrawn from the collimator axis, and means whereby a photographic plate may be pivoted about the centers of the object lenses of the projectors to such an extent that the plumb axis through the collimator passes through the nadir point.

14. Apparatus for surveying and physically reproducing objects of all kinds, particularly territorial surveying, with the aid of stereoscopic pictures and optical models, comprising at least two projectors adapted to hold the plates of the stereoscopic photographs in their natural positions in space, said projectors being arranged so that their projection rays in pairs are caused to intersect directly on the drawing or surveying table, whereby drawing, measuring out, and reproduction can be obtained in the direct ray path, a mark plate, a drawing device, and a drawing table so arranged that the projection rays of the two projectors are caused to intersect in pairs directly on the mark plate of the drawing device which is movable over the drawing table, and means are provided for the external orientation of the two projectors a collimator pivotable about the foot point of the collimator on the drawing table and a mark plate above the collimator which can be adjusted in vertical direction and also withdrawn from the collimator axis, and means on the mark plate for diverging the rays.

15. Apparatus for surveying and physically reproducing objects of all kinds, particularly territorial surveying, with the aid of stereoscopic pictures and optical models, comprising at least two projectors adapted to hold the plates of the stereoscopic photographs in their natural positions in space, said projectors being arranged so that their projection rays in pairs are caused to intersect directly on the drawing or surveying table, whereby drawing, measuring out, and reproduction can be obtained in the direct ray path, a mark plate, two projectors with semi-transparent and semi-refracting means inserted in the direct ray path to enable both the direct observation of the photographs for bringing the ray intersection on the mark plate, a double observation glass providing stereoscopic observation of the photographs in separate projections, and means for the stereoscopic observation comprising mirrors and prisms which are rotatably mounted and can exchange the images of the two projectors.

16. Apparatus for surveying and physically reproducing objects of all kinds, particularly territorial surveying, with the aid of stereoscopic pictures and optical models, comprising at least two projectors adapted to hold the plates of the stereoscopic photographs in their natural positions in space, said projectors being arranged so that their projection rays in pairs are caused to intersect directly on the drawing or surveying table, whereby drawing, measuring out, and reproduction can be obtained in the direct ray path, and auxiliary projection cameras are provided for the auxiliary projection of stereoscopic observations in which copies of the exposed plates of the main camera are inserted and having the same determination factor as the main cameras with which they may be coupled, said auxiliary cameras producing the separate projections for checking purposes.

ERICH HÖRNER.